United States Patent
Hagedorn et al.

[11] Patent Number: 5,599,062
[45] Date of Patent: Feb. 4, 1997

[54] SEAT CUSHION STEPLESS ALTERATION DEVICE

[75] Inventors: Dieter Hagedorn, Deckenpfronn; Hans-Juergen Schlaffke, Saulgau; Volker Speck, Sindelfingen; Emil Dinkel, Renningen; Otto Hoelderlin, Deckenpfronn, all of Germany

[73] Assignee: Mercedes-Benz AG, Germany

[21] Appl. No.: 536,187

[22] Filed: Sep. 29, 1995

[30] Foreign Application Priority Data

Oct. 26, 1994 [DE] Germany .................. 44 38 194.8

[51] Int. Cl.⁶ .................................................. A47C 3/025
[52] U.S. Cl. ........................ 297/284.11; 297/452.41; 297/DIG. 3
[58] Field of Search ...................... 297/284.11, 284.1, 297/452.41, DIG. 3

[56] References Cited

U.S. PATENT DOCUMENTS 5,082,326  1/1992  Sekido et al. .

FOREIGN PATENT DOCUMENTS

0204443A2  12/1986  European Pat. Off. .

Primary Examiner—Milton Nelson, Jr.
Attorney, Agent, or Firm—Evenson, McKeown, Edwards & Lenahan P.L.L.C.

[57] ABSTRACT

A device for the stepless alteration of the seat depth of a seat cushion of a car seat, has a variable-pressure air cushion which is arranged, on the front side of the seat cushion, between a padded rest and a supporting surface. An extremely high degree of support is achieved if the air cushion is configured approximately in the form of a U and its legs, oriented in the direction of the rear edge of the seat cushion, bear on a side support which terminates towards the front side of the seat cushion and is formed by the extremely dimensionally stable supporting surface.

6 Claims, 2 Drawing Sheets

SEAT CUSHION STEPLESS ALTERATION DEVICE

BACKGROUND AND SUMMARY OF THE INVENTION

The present invention relates to a device for stepless alteration of the seat depth of a car seat cushion, and more particularly to a device comprising a variable-pressure air cushion which is arranged, on the front side of the seat cushion, between a padded rest and a supporting surface. As a result of a pressure increase in the air cushion, the associated region of the padded rest is deployed. The seat surface is lengthened in the process, and a cover which covers over the padded rest consequently is lengthened by expansion of its fixed end region.

A device for altering the seat depth is described in EP 0 204 443 A2. The rectangular air cushion underside rests on a supporting surface which, when the air cushion unfolds, bends downwardly about a defined pivot axis, so that a relatively large volume of air is necessary for inflating the air cushion. An encircling fastening border encloses the air cushion which, with the unfolding of the air cushion, results in a hump-like elevation which falls away towards the side borders of the seat cushion. A side support which has considerable influence on the seat comfort is thus not provided.

An object of the present invention is to configure the air cushion and to integrate it into the seat structure such that, with a small inflation volume, in addition to the increase in the seat depth, there is also comfortable side support in the lengthening region.

This object has been achieved according to the present invention by providing that the air cushion is approximately U-shaped with legs thereof, oriented in a direction of a rear edge of the seat cushion, bearing on a side support which terminates towards the front side of the seat cushion and is formed by dimensionally stable supporting surface.

The extremely dimensionally stable supporting surface hardly yields at all when there is a build-up of pressure in the air cushion. As a result, the change in volume of the air cushion is virtually fully converted into an alteration of the seat depth. The air volume which is necessary to produce the maximum possible lengthening of the seat depth is thus relatively small and can be achieved in an extremely short period of time. The changeable-volume legs of the air cushion are assigned to the supporting surface such that they only appear at the beginning of the inflation operation. That is, the legs bring about a stepless transition from the unalterable side support to the changeable-height side support.

A reduction of pressure in the air cushion rapidly results in a reduction in volume if, on its base sides, the air cushion has lugs which are integrally formed on at least in certain areas, are connected, on the upper side, to the supporting surface by retaining means penetrating into the supporting surface, and are fixed, on the underside, on the substructure of the supporting surface with the interposition of at least one elastic strip.

In a currently preferred embodiment of the present invention, the supporting surface is formed by the upper side of a mat which covers over the spring arrangement and consists, for example, of rubberized hair.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
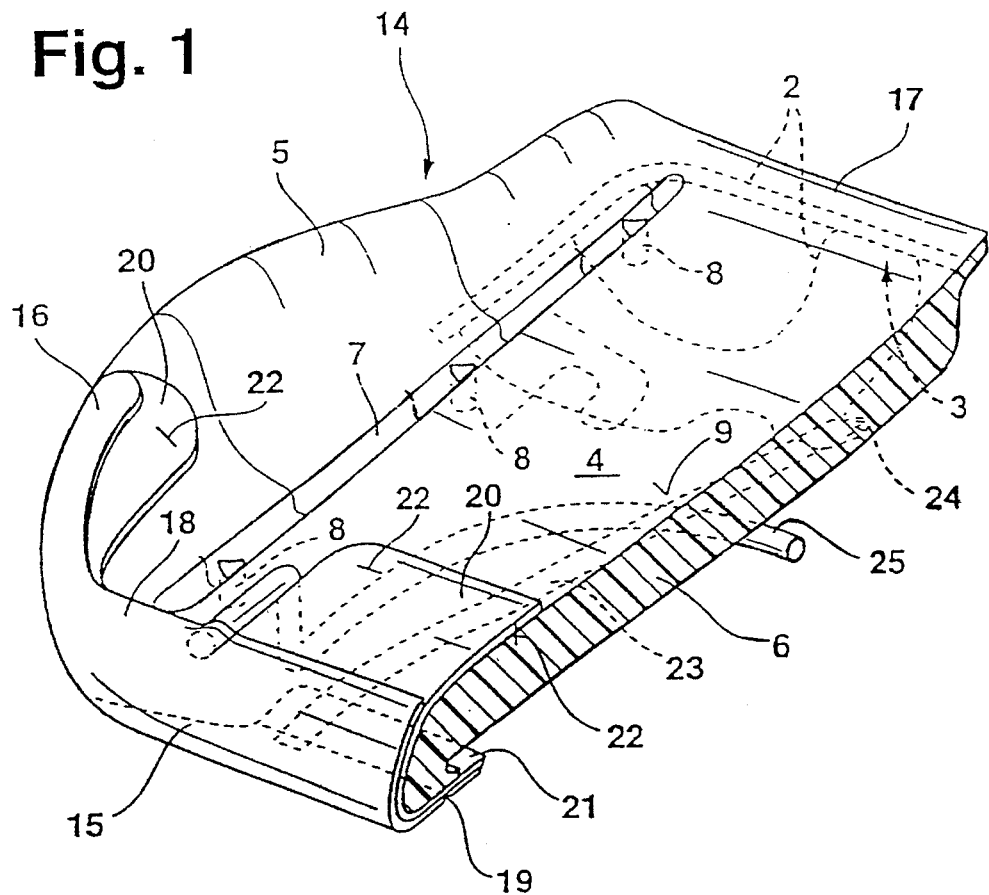
FIGS. 1 and 2 are perspective and cross-sectional side views respectively, of a seat cushion cut in the longitudinal direction, the air cushion not being in the unfolded state.
Figure 2:
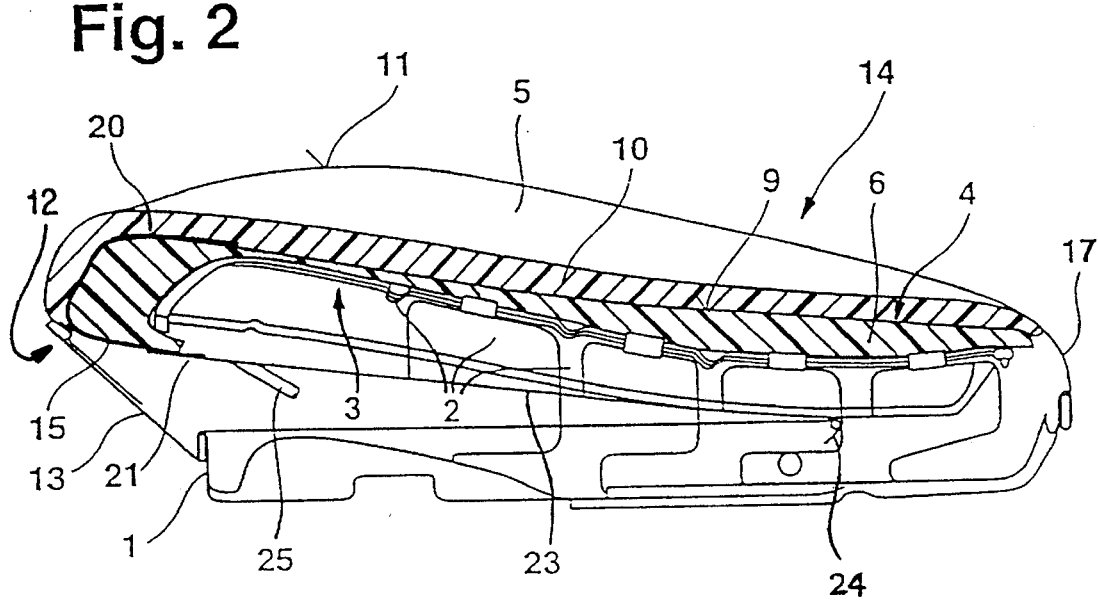
Figure 3:
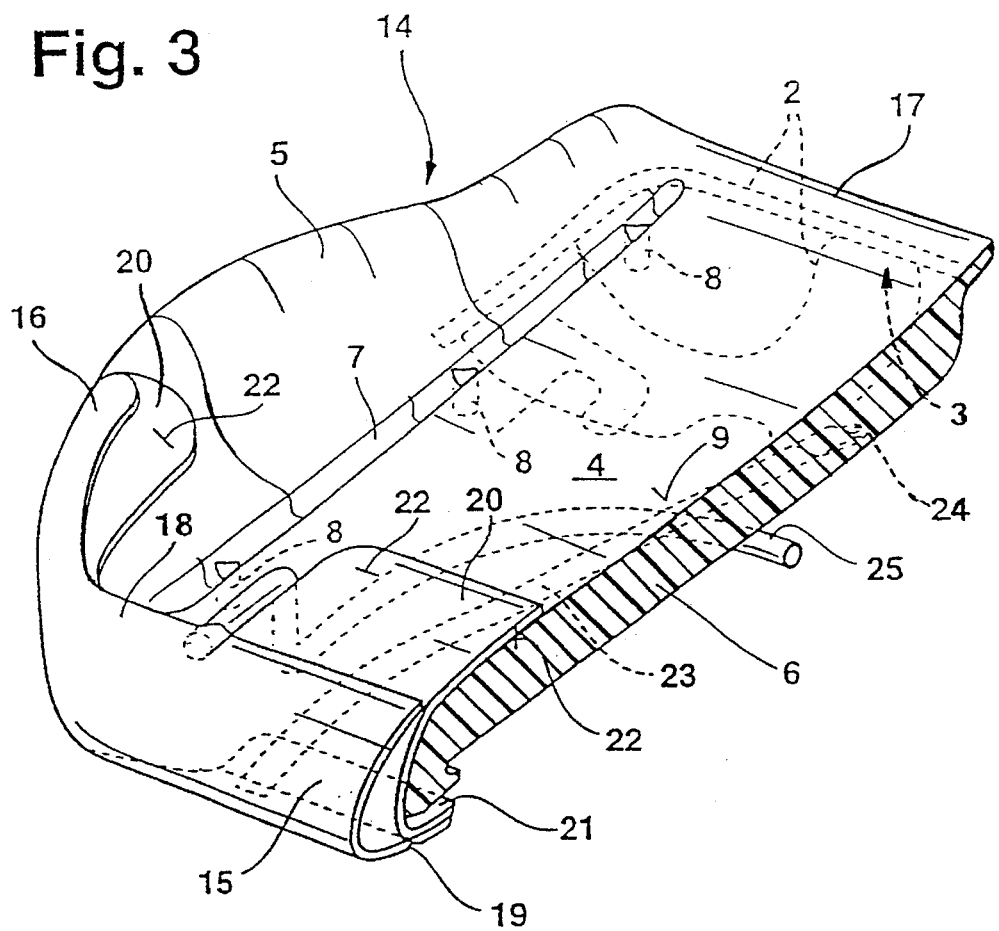
FIGS. 3 and 4 are views of the arrangement in FIGS. 1 and 2, but with the air cushion being in the unfolded state.
Figure 4:
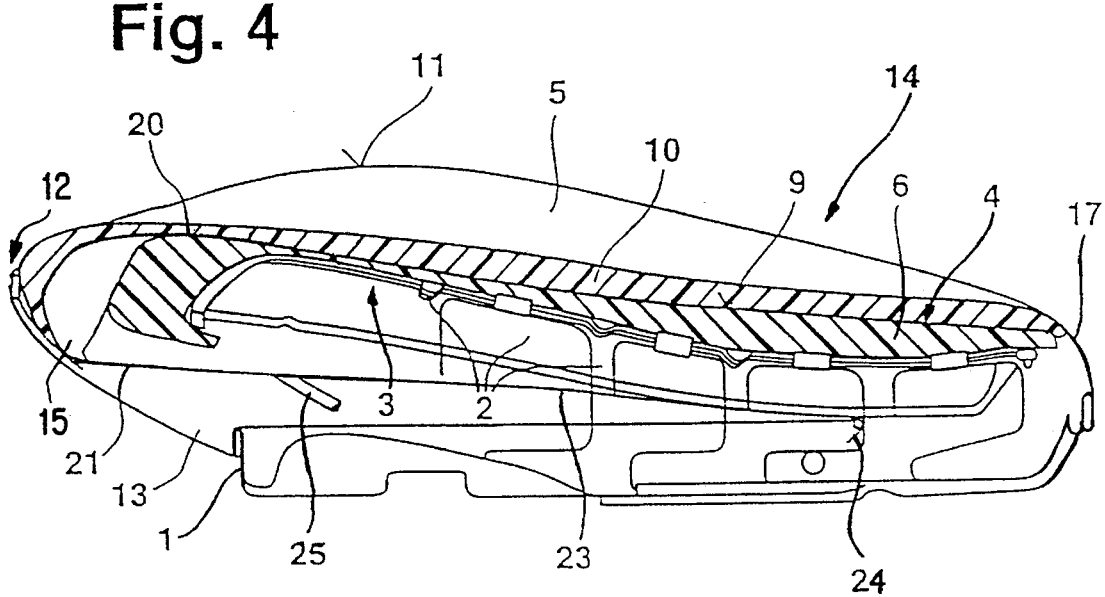

A spring arrangement 2, which comprises a plurality of individual springs and forms a substructure 3 for a supporting surface 4 which rests thereon and consists, for example, of rubberized hair, projects from a bottom frame 1 as seen in FIGS. 2 and 4. The bottom frame 1 is supported on the vehicle floor via known adjustment apparatus (not shown). The supporting surface 4 is provided with side supporters 5, of which only the side supporter which is on the right-hand side in the direction of travel can be seen in the drawings. Adjoining the supporters 5, towards the actual seat surface, a channel 7 is made in the supporting surface 4, configured as a mat 6. The channel 7 is provided at its base with ducts 8, as seen in FIGS. 1 and 3, for the through-passage of fasteners for a padded rest 10, as seen in FIGS. 2 and 4, bearing on the upper side 9 of the mat 6. The padded rest 10 is covered over by a cover 11 which, starting from the front side 12 of the seat cushion, is fitted on the bottom frame 1 by an expansible end region 13.

An air cushion 15 is inserted between the mat 6 and the padded rest 10 of the seat cushion 14 configured in the above-described manner, in the region of the front side 12 of the seat cushion. As shown in FIGS. 1 and 3, the air cushion 15 is configured approximately in a U-shape, when viewed in plan view. The two legs 16 of the U-shaped air cushion, of which only one can be seen in FIGS. 1 and 3, are oriented in the direction of the rear side 17 of the seat cushion and bear on the side supporters 5 terminating in the direction of the front side 12 of the seat cushion.

On the two base sides 18, 19 of the U-shaped air cushion 15, guided around the front of the mat 6, lugs 20, 21 which serve to fix the air cushion 15 are integrally formed on in certain areas. The lugs 20 are connected fixedly to the mat 6, for example, by clamp-like retainers 22, while the preferably one lug 21 is movably fixed via at least one elastic strip 23, which is fitted on the substructure 3 by an end-side hook 24.

In a manner which is not shown, but is known from seats with back supports, for the purpose of pressure regulation in the air cushion 15, the outgoing line 25 of the air cushion 15 can be connected to a bipressure pump with a modulator or to a single pressure source with a directional valve which also serves for venting purposes. If, starting from FIGS. 1 and 2, in which the air cushion 15, assisted by the tensioning action of the elastic strip 23, is in the fully emptied state, the air cushion 15 is supplied with compressed air, then the air cushion 15 widens in the forwards direction, while being supported on the front side of the mat 6, and thereby pushes the padded rest 10 in front thereof. The padded rest 10 is deployed, so that the seat-cushion depth is increased, as a result of which passengers with long legs also obtain a comfortable thigh rest. The side support 5 is likewise lengthened at the same time, so that, even in this respect, there is no loss of comfort.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In combination with a car seat, a device for stepless alteration of a seat depth of a seat cushion of the car seat, the device comprising a variable-pressure air cushion arranged, on a front side of the seat cushion, between a padded rest and a dimensionally stable supporting surface, such that, as a result of an increase in pressure in the air cushion, an associated region of the padded rest is deployed, with the supporting surface being thereby lengthened, and a cover of the padded rest is consequently lengthened by expansion of a fixed end region thereof, wherein the air cushion is approximately U-shaped with legs thereof, oriented in a direction of a rear edge of the seat cushion, bearing on a side support which terminates towards the front side of the seat cushion and is formed by the supporting surface.

2. The device according to claim 1, wherein base sides of the air cushion have lugs integrally formed thereon at and are connected on an upper side thereof to the supporting surface by retainers penetrating into the supporting surface and at an underside thereof on a substructure of the supporting surface with at least one elastic strip interposed therebetween.

3. The device according to claim 1, wherein the supporting surface is constituted by an upper side of a mat which covers over a spring arrangement of the car seat.

4. The device according to claim 3, wherein the mat is rubberized hair.

5. The device according to claim 3, wherein base sides of the air cushion have lugs integrally formed thereon at and are connected on an upper side thereof to the supporting surface by retainers penetrating into the supporting surface and at an underside thereof on a substructure of the supporting surface with at least one elastic strip interposed therebetween.

6. The device according to claim 5, wherein the mat is rubberized hair.

* * * * *